(No Model.) 4 Sheets—Sheet 1.

P. KÄMMERER.
AUTOMATIC CALIPERING MACHINE.

No. 471,557. Patented Mar. 29, 1892.

Witnesses:
R. Herpich.
E. Schultze.

Inventor:
Paul Kämmerer.
by
Attorneys.

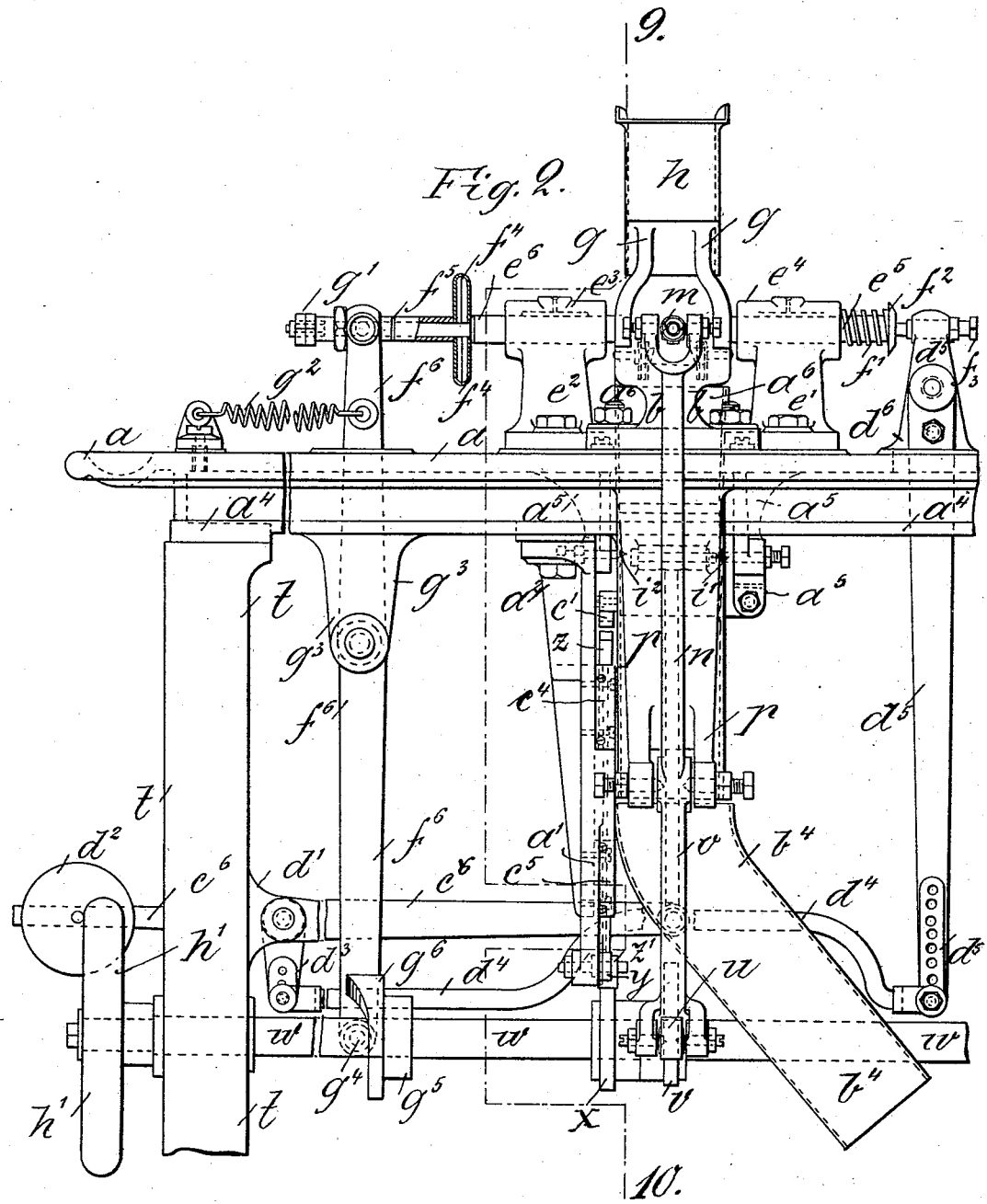

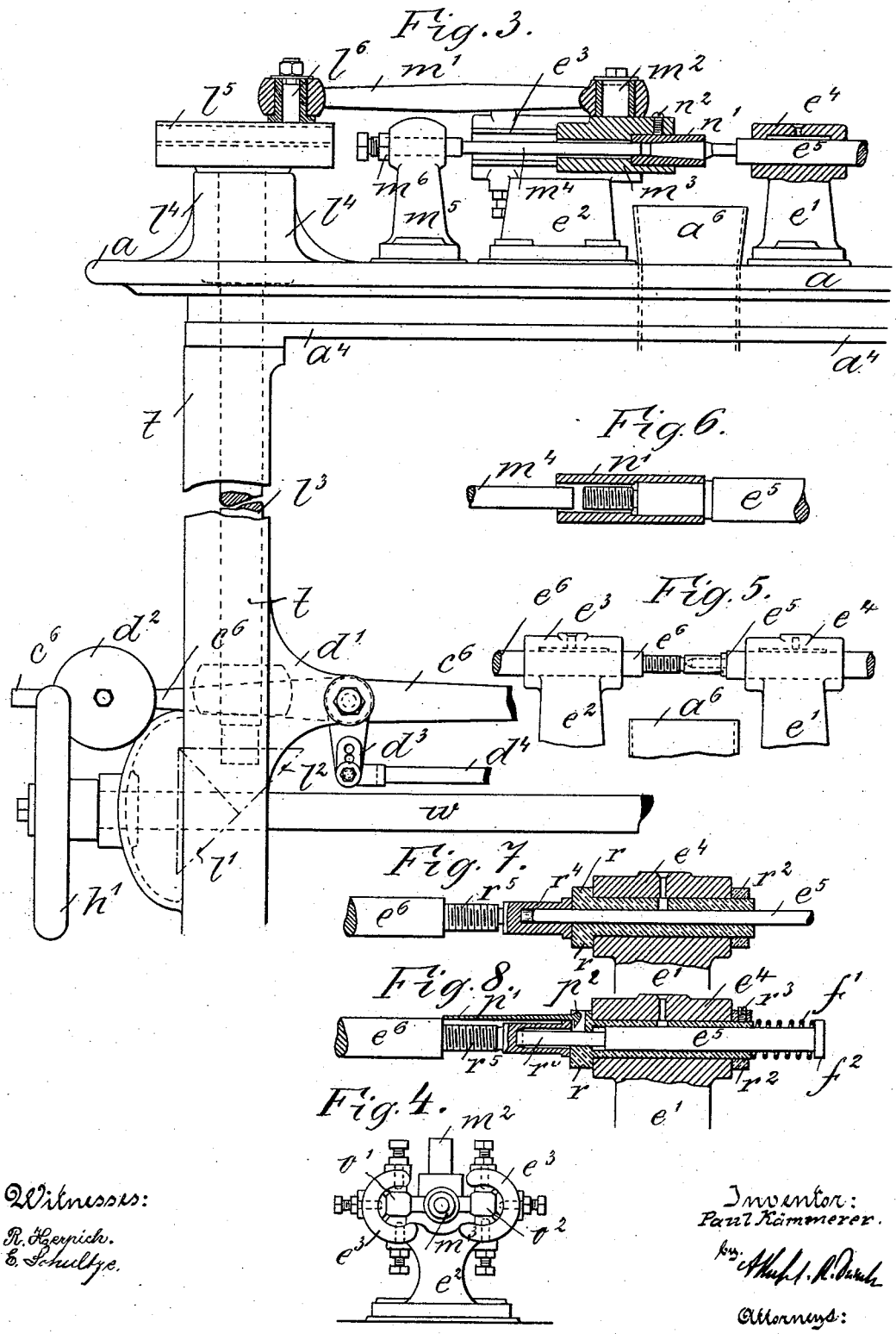
(No Model.) 4 Sheets—Sheet 3.
P. KÄMMERER.
AUTOMATIC CALIPERING MACHINE.
No. 471,557. Patented Mar. 29, 1892.

(No Model.)  4 Sheets—Sheet 4.

P. KÄMMERER.
AUTOMATIC CALIPERING MACHINE.

No. 471,557. Patented Mar. 29, 1892.

Witnesses:
E. Schultze.
G. A. Taube.

Inventor:
Paul Kämmerer
by Kuhnt & ...
Attorneys.

UNITED STATES PATENT OFFICE.

PAUL KÄMMERER, OF TROISDORF, GERMANY.

AUTOMATIC CALIPERING-MACHINE.

SPECIFICATION forming part of Letters Patent No. 471,557, dated March 29, 1892.

Application filed February 4, 1891. Serial No. 380,162. (No model.) Patented in France January 14, 1891, No. 210,780; in England January 16, 1891, No. 842; in Switzerland January 17, 1891, No. 3,224; in Belgium January 21, 1891, No. 93,507; in Spain January 26, 1891, No. 11,718, and in Italy January 26, 1891, No. 28,973.

*To all whom it may concern:*

Be it known that I, PAUL KÄMMERER, a subject of the King of Prussia, German Emperor, and a resident of Troisdorf, in the Province of the Rhine, Kingdom of Prussia, German Empire, have invented certain new and useful Improvements in Automatic Measure-Testing Machines, (for which I have obtained Letters Patent in Switzerland, No. 3,224, dated January 17, 1891; in Great Britain, No. 842, dated January 16, 1891; in Belgium, No. 93,507, dated January 21, 1891; in France, No. 210,780, dated January 14, 1891; in Spain, No. 11,718, dated January 26, 1691, and in Italy, No. 28,973, dated January 26, 1891,) of which the following is a full and exact specification.

This invention relates to a machine by means of which the dimensions of bodies may be automatically measured.

It is especially the object of the machine to measure or to test the correctness of a dimension of bodies, parts, and pieces which are manufactured in great quantities and the dimension of which must be of greatest accuracy, as necessary, for instance, with all those parts used for the manufacture of guns, rifles, revolvers, and other weapons.

The machine is characterized by its ability to not only separate parts of correct dimension from those of incorrect dimension, but also to separate parts which are too long or too thick from those which are too short or too thin. Measurements of any imaginable kind may be executed perfectly, automatically, and with an exactness and quickness not having been attained heretofore.

In order to make my invention more clear I refer to the accompanying drawings, in which similar letters denote similar parts throughout the different views, and in which—

Figure 1:
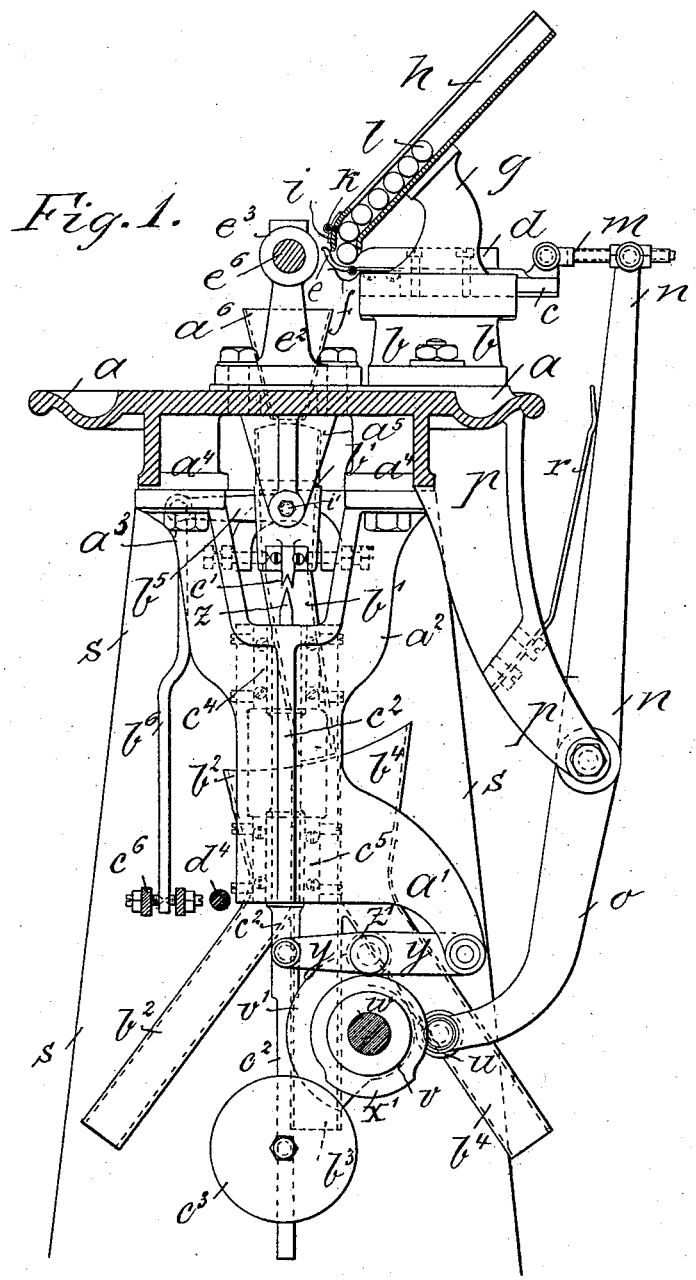
Figure 9:
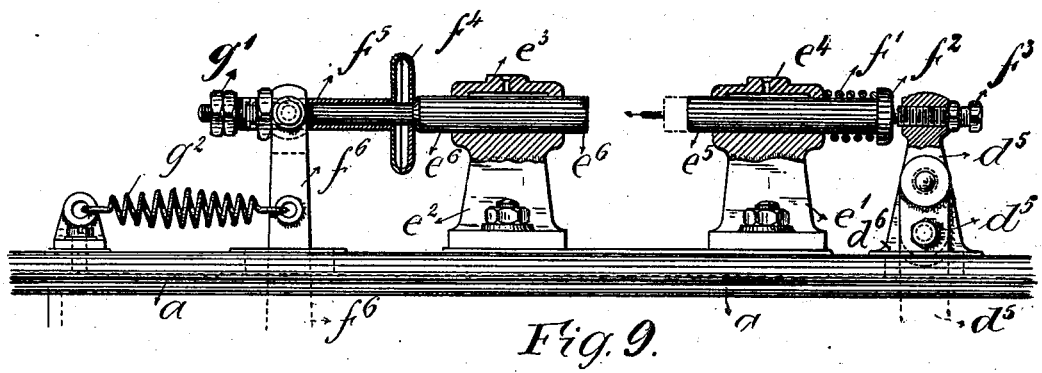
Figure 10:
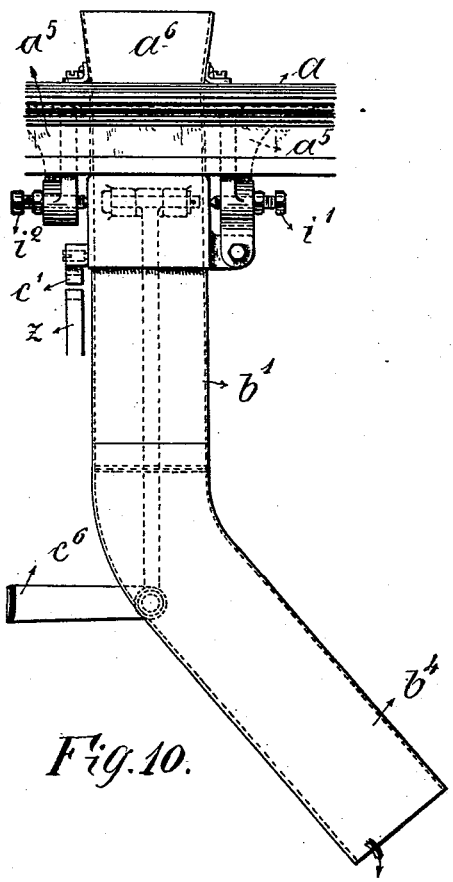
Figure 11:
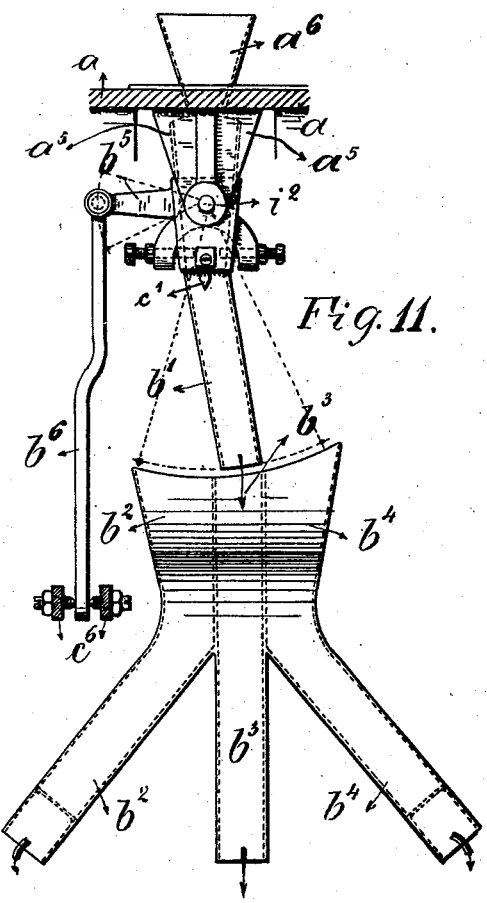

Figure 1 is a side view of the machine, partly in section, taken on the line 9 10 of Fig. 2 and seen from lever $f^6$ to lever $d^5$. Fig. 2 is a back view. Fig. 3 is a modification of a part of Fig. 1. Fig. 4 is an end view of the standard $e^2$ in the modification of Fig. 3. Figs. 5 to 8 illustrate several methods of measurements. Fig. 9 shows the calipering-points of the bolts $e^5$ and $e^6$ in Fig. 2. Figs. 10 and 11 show the arrangement of the chute $b'$ with its adjuncts.

For the sake of distinctness I deem it advisable to describe at first the mechanical construction of the machine and afterward the effect and co-operation of the several parts, which consist in the whole of a feeding device for the pieces to be measured, of a measuring device, and of a delivery device for the pieces measured.

Two feet or supports, only one of which is to be seen in Figs. 1 and 2, carry a frame $a^4$, to which is attached the table $a$. This latter bears three standards $b$, $e'$, and $e^2$, $b$ for holding the feeding device, and $e'$ $e^2$ for holding two bolts $e^5$ and $e^6$, between which the piece to be measured is placed. Standard $b$, Fig. 1, has a slide $c$ and two upwardly-extending arms $g$ $g$, which latter hold a tube or channel $h$, in which the pieces $l$ to be measured are contained. Slide $c$ is connected at its rear side with the upper extremity of a double-armed lever $n$ $o$ by means of a short arm $m$, and has at its front side a bent fork $e$, which is influenced by a spring $f$ and is secured to a longish projection $d$, firmly secured to slide $c$. Fork $e$ holds always the undermost piece $l$, which is carried forward by the movement of slide $c$, whereat a flap $i$, forming the under extremity of tube $h$, is swung outward. The flap is closed afterward automatically by a spring $k$. Lever $n$ $o$ has its fulcrum or bearing in a strong arm $p$, extending downwardly from table $a$. Said arm has also a flat spring $r$, influencing arm $n$ of the lever, to the other arm $o$ of which is attached a roll $u$, which may be influenced by a long projection $v'$ of a disk $v$, fixed to a shaft $w$. The latter has its bearings in the feet or supports of the machine. Shaft $w$ carries at the right-hand side of the disk $v$—i. e., the left-hand side in Fig. 2—another disk $x$, which is also provided with a somewhat longish projection $x'$, by means of which a lever $y$ may be moved. Projection $x'$ does not act directly on lever $y$, but first on a roll $z'$, attached to said lever for decreasing friction. Lever $y$ is secured at a side to a strong arm $a'$, which extends downwardly and is held by two other arms $a^2$ $a^3$, fixed to frame $a^4$. The other side of lever $y$ holds a vertical rod $c^2$, provided at its top with a wedge $z$ and at its other end with a weight $c^3$. Said rod is guided by guides $c^4 c^5$, which are also fixed to the arms $a^2$, $a^3$, and $a$, respectively. Shaft $w$ has, moreover, a third disk $g^5$, a side of which is provided with an oblique projection $g^6$, which may act on a roll $g^4$, secured to the under extremity of a double-armed lever $f^6$. The latter has its fulcrum or bearing in an arm $g^3$, extending downwardly from frame $a^4$, and is influenced by a spring $g^2$, which tends to impart a vertical position to lever $f^6$ after the latter has been deviated by disk $g^5$. The upper extremity of said lever bears a hollow spindle $f^5$, to the left-hand side of which—i. e., right hand in Fig. 2—is secured a very strong flat spring $f^4$. Hollow spindle $f^5$ contains the thinner part of a bolt $e^6$, the thicker portion of which is inserted and guided in head $e^3$ of standard $e^2$, and which has at the other side two female screws $g'$, resting against spindle $f^5$ and drawing the thick portion of bolt $e^6$ against spring $f^4$. It will thus be seen that the reciprocating motion of bolt $e^6$ will always be of same extent, as it merely depends on the height or size of projection $g^6$ of disk $g^5$ on shaft $w$. Spring $f^4$ is so strong that it is not bent or influenced in the least as long as regular work is done by the machine. Said spring acts, so to say, as safety-valve, as will be explained more fully hereinafter. A similar bolt $e^5$ is contained in head $e^4$ of standard $e'$ and has at its left-hand side—i. e., the right-hand side in Fig. 2—a projection $f^2$, against which presses a spring $f'$. By this pressure bolt $e^5$ is pressed against an adjustable screw $f^3$, which is fixed to the upper extremity of a double-armed lever $d^5$, having its fulcrum in a bearing $d^6$, secured to table $a$. Lever $d^5$ is at its under extremity connected with a bent rod $d^4$, the other end of which is attached to a short arm $d^3$, which is made in one piece with another double-armed lever $c^6$. The latter has its fulcrum in a bearing $d'$, fixed to support $t$ of the machine, and has its short arm counterbalanced by a weight $d^2$. The other end of lever $c^6$ influences a bent vertical rod $b^6$, Fig. 1, which is in connection with a short arm $b^5$, secured to a swinging or oscillating chute $b'$. Chute $b'$ swings between two points $i'$ $i^2$, Fig. 2, provided in two arms $a^5 a^5$, extending downwardly from table $a$. The upper opening of said chute moves below a stationary chute $a^6$, arranged between standards $e'$ $e^2$ and before standard $b$, while the under opening of said chute moves above three delivery tubes or channels $b^2$ $b^3$ $b^4$, which are firmly connected at the upper extremities, but diverge thereafter to the respective delivery-boxes. (Not shown in the drawings.) To a side of chute $b'$ is secured a double wedge $c'$, which of course partakes of the oscillations or movements of the chute and which may be influenced or fixed by edge $z$ of rod $c^2$. Shaft $w$ has at one side a loose and a fast pulley (not to be seen in Fig. 2) and at the other side a hand-wheel $h'$, the purpose of which needs no further explanation.

Having thus described the mechanical construction of the machine, I now proceed to explain the effect and co-operation of the several parts: After having filled tube $h$ with a portion of those pieces the length of which shall be tested or measured, and after having adjusted or regulated screw $f^3$ of lever $d^5$, according to the normal length the respective pieces ought to have, the belt is transferred from the loose pulley to the fast one by a belt-shifter in known manner, and thus shaft $w$, with its three disks $v$ $x$ $g^5$, caused to rotate. The bolts $e^5$ $e^6$ in the heads $e^3$ $e^4$ of the standards $e'$ $e^2$ have, when in normal position, as shown in Fig. 2, such a distance as to allow each of the pieces brought forward by slide $c$ to freely enter the space between them. Now as soon as projection $v'$ of disk $v$ pushes against roll $u$ of lever $o$ $n$, slide $c$, with its appurtenances $d$ $e$ $f$ and with one of the pieces $l$, is moved forward by arm $m$ as far as to bring that piece $l$ directly between the bolts $e^5$ $e^6$. Instantly thereafter projection $g^6$ of disk $g^5$ pushes against roll $g^4$ of lever $f^6$, thus deviating the upper arm of it to the left-hand side—i e., the right-hand side in Fig. 2—and extending spring $g^2$. By the movement of lever $f^6$ the bolt $e^6$, and with it the piece to be measured, and bolt $e^5$ are moved. The extent of the movement or displacement of bolt $e^6$ depends merely on the size and height of projection $g^6$ on disk $g^5$, as already explained. The extent of the displacement of bolt $e^5$, however, depends on the length of that piece contained between and held by said bolts. As bolt $e^5$ is pressed now against screw $f^3$ of lever $d^5$, this latter is deviated, and its deviation is conveyed by rod $d^4$ and arm $d^3$ to lever $c^6$, and the deviation of lever $c^6$ is conveyed by rod $b^6$ and arm $b^5$ to the oscillating chute $b'$. It is obvious that also the deviation of chute $b'$ depends on the length of that piece between the bolts $e^5$ $e^6$, and in consequence of this deviation the under opening of chute $b'$ will be guided or placed over one of the tubes $b^2$ $b^3$ $b^4$. In case the piece measured be of exactly correct length chute $b'$ will stand over tube $b^3$—i. e., the middle one. In case the piece be too long chute $b'$ will be placed over tube $b^4$, and in case that piece be too short chute $b'$ will be deviated so as to get tube $b^2$. Now it may happen, however, that the piece measured be but very little too long or too short, and that the dimension be still within the scope of allowance. In such a case chute $b'$ will not be placed directly over one tube only, but more or less over two of them, according as the length of the respective piece within or without the "scope of allowance," by which latter term I understand the slide deviations, the pieces or parts are allowed to have with- out being declared incorrect. As it is necessary, however, to direct chute $b'$ always perfectly over one of said tubes, or, in other words, to direct it above tube $b^3$ in case the deviation in length be within the scope of allowance, and to direct it above tube $b^2$ or $b^4$ in case the deviation in length be without the scope of allowance, the device shown by $x\ x'$ $z'\ y\ c^2\ z\ c'$ has been provided. The parts indicated by these letters have been formerly explained. Now as soon as chute $b'$ has reached the position imparted to it by the lever arrangement before described projection $v'$ of disk $v$ leaves roll $u$ of lever $o\ n$, thus causing slide $c$ to regain its original position by the effect of spring $r$. During that time rod $c^2$ is raised by the influence of projection $x'$ of disk $x$ on roll $z'$ of lever $y$, and thus the respective position of chute $b'$ is regulated, finished, and fixed by the wedge-like effect of edge $z$ on the double edge $c'$. The same effect may be had by furnishing rod $c^2$ with a double edge and chute $b'$ with a single one. Instantly after chute $b'$ is fixed in correct position projection $g^6$ of disk $g^5$ leaves roll $g^4$ of lever $f^6$, and the latter regains its normal vertical position by the influence of spring $g^2$. Now as the pressure exerted by lever $f^6$ on the bolts on the piece measured and on the other lever arrangement ceases the latter parts regain also their normal position and the respective piece is carried by the bolts over the stationary chute $a^6$. When in normal position, the distance between the bolts is somewhat greater than the parts or pieces to be measured, as already said. Thus the latter when arriving directly over the chute $a^6$ will let loose by the bolts and will fall downward through chutes $a^6$ and $b'$ into that tube which leads to the box containing those pieces which the piece just measured belongs to. The measurement of that piece is thus accomplished. In certain cases it may be of advantage to furnish the three disks on shaft $w$ with two or three noses or projections, and thus to rotate shaft $w$ with but a half or a third of the velocity used with one projection.

It has been shown in the foregoing in what manner testings of lengths could be effected. The machine is capable, however, of also testing or measuring, for instance, either the thickness of a piece or the correct shape of a cone, or the correct length of the worm of a screw, or the depth of a hole. In short, every imaginable dimension or shape of any part, piece, or portion may be tested. For executing measurements of such kind a modification of bolt $e^6$ and of the mechanism for moving it is necessary, as bolt $e^6$, before effecting the displacement of bolt $e^5$ and the deviation of the lever arrangement, must grip a certain extent over or into the respective piece. For that purpose the modification, Fig. 3, has been constructed, in which a combination of two slides $v^2\ v^2$, with a bolt $m^3$, is used in lieu of the simple bolt $e^6$, above described. In this case is tested the conical part of a piece which is pressed against the bolt $e^5$ and causes the regulation of the chute in exactly the same manner as before described. This modified form is constructed as follows: The head of standard $e^2$ is enlarged so as to form two guides $e^3\ e^3$, Fig. 4, in which two slides $v'\ v^2$, connected by a hollow bolt $m^3$, may be moved to and fro. Said bolt $m^3$ is moved by a rotating disk $l^5$, with which it is connected by means of a connecting-rod $m'$, fastened at one side to the upper part of bolt $m^3$ by a pin $m^2$ and at the other to disk $l^5$ by means of a crank-pin $l^6$. Disk $l^5$ rests on a bearing $l^4$ and is secured to the upper extremity of a shaft $l^3$, which is driven by shaft $w$ by means of two conical wheels $l^2\ l'$. Bolt $m^3$ is at a side furnished with a chuck $n'$, which is fastened by means of a screw $n^2$. The size, shape, bore, &c., of the chuck depend on the kind of measurement to be made and must of course correspond thereto. A third standard $m^5$ is arranged between standard $e^2$ and bearing $l^4$ and holds a horizontal rod $m^4$, which is secured to the head of said standard and may be adjusted by female screws $m^6$. Rod $m^4$ extends through bolt $m^3$ and reaches into the chuck, so as to prevent the chuck from taking the piece measured with it when all the parts regain their normal positions. The manner of working of this modified form is clearly to be understood from the foregoing description and from Fig. 3.

In Fig. 8 it is shown that the chuck may be attached not only to bolt $m^3$ or $e^6$, respectively, but also to standard $e'$. In this figure $r$ is the chuck, which is secured to head $e^4$ of standard $e'$ by a ring $r^2$ and screw $r^3$. Bolt $e^5$ has a plug or pin $r^4$ reaching into the hole of piece $r^5$, the depth of which hole is to be tested. A flat spring $p'$, fixed to bolt $e^6$ and having a hook $p^2$, serves for drawing the piece $r^5$ off $r^4$ after the measurement is finished.

Figs. 5 to 7 illustrate several kinds of measurements which need no further explanation.

Having thus fully described the nature of this invention, what I desire to secure by Letters Patent of the United States is—

1. In an automatic measure-testing machine, the combination of a shaft $w$, having three disks $v\ x\ g^5$, three rods or levers $n\ o\ c^2 f^6$, with a feeding device, a measuring device, and a delivery device, said rods or levers being influenced by said disks and acting on said devices, substantially as and for the purpose described.

2. In an automatic measure-testing machine, the combination of a disk $g^5$, having one or more noses $g^6$, and a lever $f^6$, actuated by said disk, with a displaceable bolt $e^6$, acting on the measuring device, substantially as and for the purpose described.

3. In an automatic measure-testing machine, the combination of a disk $x$, having one or more noses $x'$, and a rod $c^2$, actuated by said disk, with a single or other edge or wedge $c$, acting on the delivery device, substantially as and for the purpose described.

4. In an automatic measure-testing machine, the combination of a single or other edge or wedge $z$, fixed to rod $c^2$, and an oscillating chute $b'$, actuated by bolt $e^5$, with another single or other edge or wedge $c'$, fixed to said chute, said edge or wedge $z$ adapted to regulate, finish, and fix the position of chute $b'$, substantially as and for the purpose described.

In testimony whereof I have signed this specification in the presence of two subscribing witnesses.

PAUL KÄMMERER.

Witnesses:
GUSTAVE OELRICHS,
OTTO DAHLMANN.